United States Patent [19]
Oinoue et al.

[11] Patent Number: 5,485,445
[45] Date of Patent: Jan. 16, 1996

[54] DISC DRIVING APPARATUS HAVING MEANS FOR PLACING A READ RECORD HEAD AT A PREDETERMINED POSITION IN THE INNERMOST REGION OF A DISC

[75] Inventors: Hiroshi Oinoue, Tokyo; Tokio Kanada, Kanagawa, both of Japan

[73] Assignee: Sony Corporation, Tokyo, Japan

[21] Appl. No.: 252,069

[22] Filed: Jun. 1, 1994

Related U.S. Application Data

[63] Continuation of Ser. No. 989,356, Dec. 11, 1992, abandoned.

[30] Foreign Application Priority Data

Dec. 13, 1991 [JP] Japan .................................. 3-351982
Oct. 9, 1992 [JP] Japan .................................. 4-298068

[51] Int. Cl.$^6$ ........................................................ G11B 3/90
[52] U.S. Cl. ............................................. 369/56; 369/43
[58] Field of Search ................................ 369/47, 58, 54, 369/50, 53, 55, 56, 43

[56] References Cited

U.S. PATENT DOCUMENTS

| | | | |
|---|---|---|---|
| 4,723,235 | 2/1988 | Yasuda et al. | 369/50 |
| 5,136,569 | 8/1992 | Fennema et al. | 369/58 |

FOREIGN PATENT DOCUMENTS

| | | |
|---|---|---|
| 0294545A2 | 12/1988 | European Pat. Off. . |
| 0418702A2 | 3/1991 | European Pat. Off. . |
| 04580267A1 | 11/1991 | European Pat. Off. . |
| 2199137 | 6/1988 | United Kingdom . |

Primary Examiner—Georgia Y. Epps
Assistant Examiner—P. W. Huber
Attorney, Agent, or Firm—Limbach & Limbach; Alan S. Hodes

[57] ABSTRACT

A disc driving apparatus comprising an optical head as a record/reproduce means for recording information on and/or reproduce the same optically from a disc type recording medium; a feed motor as a feed means for moving the optical head toward the innermost or outermost region of the disc; a limit switch as a detector means for detecting that the optical head is placed at a first position proximate to the innermost region of the disc; and a butt member as a positioning means formed to butt against the optical head for limiting the motion of the optical head at a second position in the innermost region of the disc. The speed of the optical head being moved toward the innermost region of the disc by means of the feed motor is changed to a lower speed in synchronism with turn-on of the limit switch, and then the optical head is brought to a halt at the predetermined position limited by the butt member, whereby the optical head is placed exactly at the desired position.

10 Claims, 8 Drawing Sheets

DISC DRIVING APPARATUS HAVING MEANS FOR PLACING A READ RECORD HEAD AT A PREDETERMINED POSITION IN THE INNERMOST REGION OF A DISC

This is a continuation of application Ser. No. 07/989,356 filed Dec. 11, 1992, now abandoned.

BACKGROUND OF THE INVENTION

1. Field of the Invention

The present invention relates to a disc driving apparatus and, more particularly, to an apparatus capable of properly positioning an optical head so that, when the optical head starts its operation of recording an information signal on or reproducing the same from a disc type recording medium, a spot of a signal recording/reproducing light beam emitted from the optical head to the disc is placed exactly at a predetermined position on in the innermost region of the disc.

2. Description of the Prior Art

On an optical disc known as a compact disc or the like, it is generally customary that a lead-in area is formed in an innermost region thereof where data (TOC) representing the table of contents of information recorded on the optical disc is described. At the start of a playback operation, an optical disc apparatus first reads out the TOC data from such innermost lead-in area. In this case, it is necessary to place the optical head at a predetermined position by moving the same to the innermost region.

FIG. 1 is a partially sectional side view showing the principal structure of a conventional optical disc apparatus, and FIG. 2 is a circuit block diagram of such conventional optical disc apparatus. In these diagrams, an optical disc 1 is loaded on a turntable 2 by means of a chucking device 3 in a manner to be rotatable by a spindle motor 5, which is anchored to a projecting center portion 4a of a chassis 4. An optical head 6 is movable on a guide shaft 7 supported between the center portion 4a of the chassis 4 and a projecting peripheral portion 4b of the chassis 4. A limit switch 11 is attached to a stand 12 anchored to a bottom 4c of the chassis 4 at a position proximate to the innermost region of the optical disc 1 (proximate to the spindle motor 5).

At the start of playback of the optical disc 1, a CPU 15 first transmits a command to a drive circuit 16 for reading out the data from the lead-in area, thereby supplying a predetermined voltage to a feed motor 8. Then the feed motor 8 is rotated by such voltage. Subsequently a speed reduction mechanism 9 is driven with rotation of the feed motor 8, and a rack gear 10 engaged with the optical head 6 is driven by the action of the reduction mechanism 9, so that the optical head 6 is moved on the guide shaft 7 toward the innermost region (leftward in FIG. 1). Upon completion of the shift of the optical-head 6 to the predetermined position in the innermost region, a sensing lever 13 of the limit switch 11 is pressed by the optical head 6 and therefore the limit switch 11 is closed, so that the CPU 15 detects the arrival of the optical head 6 at the predetermined position. Then the CPU 15 cancels the command to the driving circuit 16 synchronously with the closing of the limit switch 11, thereby halting the optical head 6.

In the conventional optical disc apparatus mentioned above, there exist the following problems. [1] An intricate procedure is necessary for executing a radial fine adjustment of the stand 12 where the limit switch 11 is attached, and turning on the limit switch 11 properly so that the spot 14 of the signal recording/reproducing light beam emitted from the optical head 6 at the stop position can be irradiated exactly to the lead-in area. [2] The speed of the optical head 6 at the time of pressing the sensing lever 13 is different depending on whether the position of the optical head 6 prior to its motion toward the innermost region is proximate to the limit switch 11 or is spaced apart therefrom, and consequently the distance of the inertial motion of the optical head 6 becomes different in such two cases. As a result, the beam spot 14 may fail to be irradiated accurately to the lead-in area even after the adjustment in [1].

[3] If the spot 14 of the signal recording/reproducing light beam emitted from the optical head 6 is deviated from the lead-in area, there may be adopted a method of returning the beam spot 14 to the lead-in area on the basis of the address information of the signal recorded at the deviated position. However, on any disc where the lead-in area is formed to be extremely narrow and no track is existent inside the lead-in area, it is impossible to apply tracking servo control at such position so that there is a failure in reproducing the signal. Therefore the beam spot is not returnable to the lead-in area.

OBJECT AND SUMMARY OF THE INVENTION

It is an object of the present invention to provide a novel disc driving apparatus which is capable of accurately positioning, with facility and at low cost, an optical head at a desired position corresponding to a lead-in area of an optical disc, while eliminating the necessity of the known intricate adjustment for placing, in the lead-in area of the optical disc, a spot of a light beam emitted from the optical head.

According to one aspect of the present invention, there is provided an improved disc driving apparatus for optically recording an information signal on and/or reproducing the same from an optical disc as a recording medium. The apparatus comprises an optical head serving as a record/reproduce means for recording information on and/or reproducing the same from the optical disc; a feed motor as a feed means for moving the optical head toward the inner region or the outer region of the optical disc; a limit switch as a detector means for detecting that the optical head is placed at a first position proximate to the innermost region of the optical disc; and a butt member as a positioning means formed to butt against the optical head for limiting the motion of the optical head at a second position in the innermost region of the optical disc.

In the disc driving apparatus of the structure mentioned, the optical head is moved toward the innermost region of the optical disc by means of the feed motor. The motion of the optical head is selectively changed to, e.g., a lower speed in synchronism with turn-on of the limit switch, and then the optical head is brought to a halt at the predetermined position limited by the butt member. Consequently it becomes possible to place the optical head exactly at the desired position.

The above and other features and advantages of the present invention will become apparent from the following description which will be given with reference to the illustrative accompanying drawings.

DESCRIPTION OF THE PREFERRED EMBODIMENTS

Figure 1:
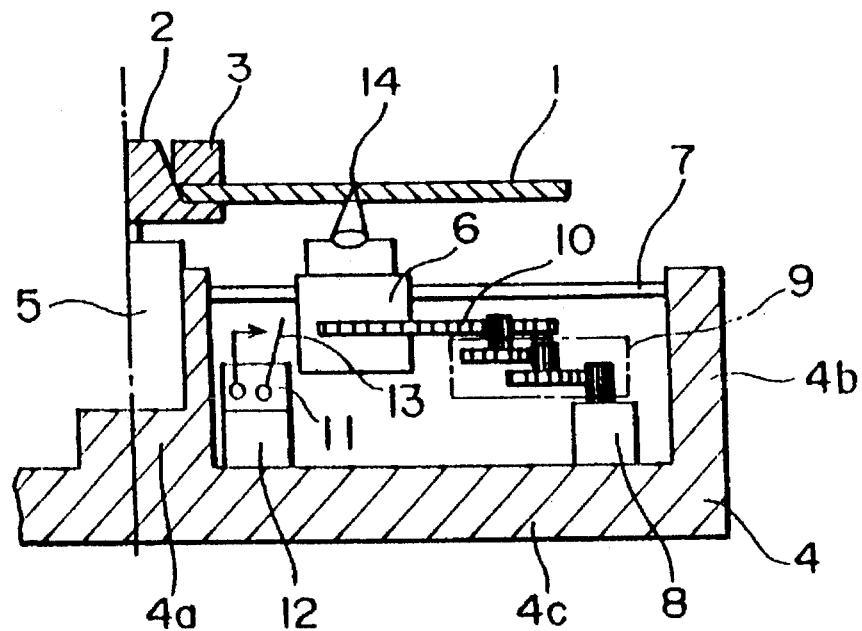
FIG. 1 is a partially sectional side view showing the principal structure of a conventional optical disc apparatus.
Figure 3:
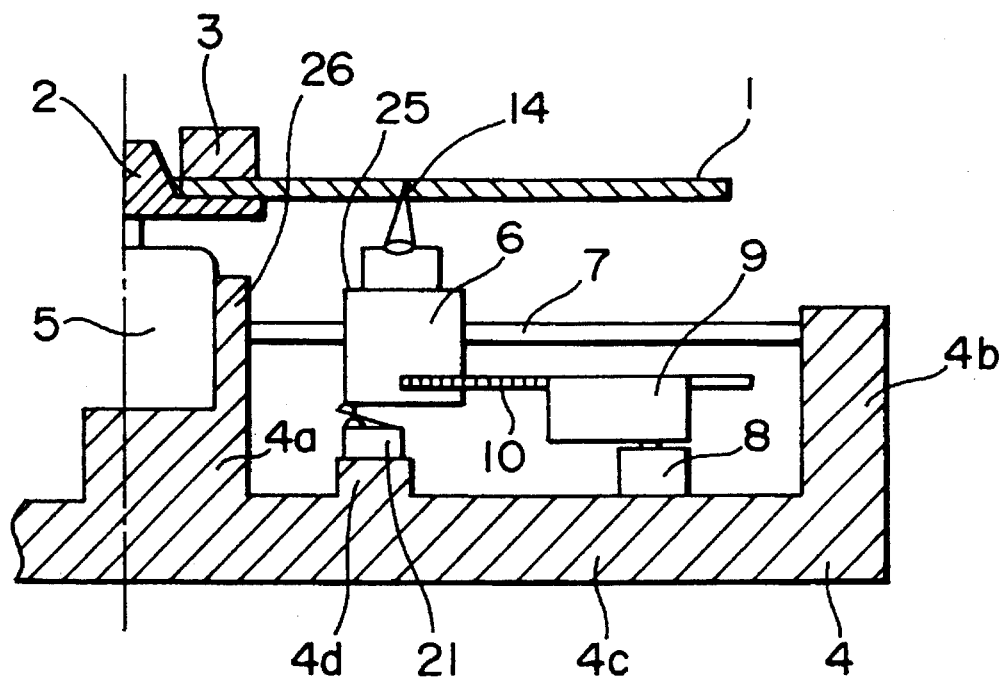
FIG. 3 is a partially sectional side view showing the principal structure of a preferred embodiment which represents the disc driving apparatus of the present invention.

Hereinafter preferred embodiments of the present invention will be described in detail with reference to the accompanying drawings. FIG. 3 is a partially sectional side view of an exemplary embodiment representing a disc driving apparatus of the present invention, particularly an apparatus for driving an optical disc. The same component elements as those used in the aforementioned conventional apparatus of FIG. 1 are denoted by the same reference numerals, and a repeated explanation thereof is omitted here.

In FIG. 3, a known stand 12 is not provided on a bottom 4c of a chassis 4, and instead a projection 4d is formed at a first position which is spaced apart downward by a predetermined distance from a bottom of an optical head 6 and is slightly outside the innermost (i.e. the TOC) region of the disc 1. A limit switch 21 is attached onto the projection 4d in such a manner that the optical head 6 is movable further toward the innermost region after turning on the limit switch 21. A butt member 26 is provided on one side of a center portion 4a of the chassis 4, so that the optical head 6 can be brought to a halt when an inner lateral portion 25 thereof is pressed against the butt member 26. Upon the halt of the optical head 6 by the butt member 26 pressed to its inner lateral portion 25, a spot 14 of a signal reading light beam irradiated from the optical head 6 to the optical disc 1 is placed exactly at a second position in the innermost lead-in area of the optical disc 1.

Figure 4A:
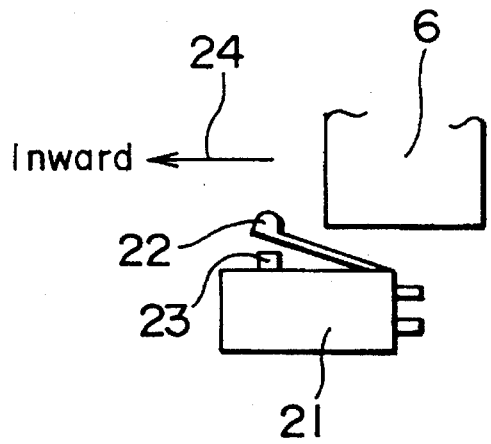
FIGS. 4(A) and 4(B) are detailed diagrams for explaining the operation of a limit switch employed in the disc driving apparatus of FIG. 3.
Figure 4B:
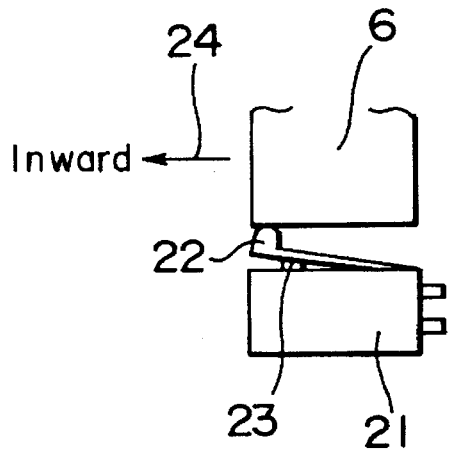

FIGS. 4(A) and 4(B) are detailed diagrams for explaining the operation of the limit switch 21 employed in the apparatus of FIG. 3. As shown in FIG. 4(A), the limit switch 21 has a sensing lever 22 and a contact 23. The optical head 6 in its motion toward the innermost region as indicated by an arrow 24 in FIG. 4(A) is further moved in the direction of the arrow 24 while pressing the sensing lever 22. At this time, as shown in FIG. 4(B), the contact 23 is also pressed so that the limit switch 21 is turned on by the optical head 6. As the optical head 6 is further moved in the direction of the arrow 24, the limit switch 21 is kept closed.

Figure 2:
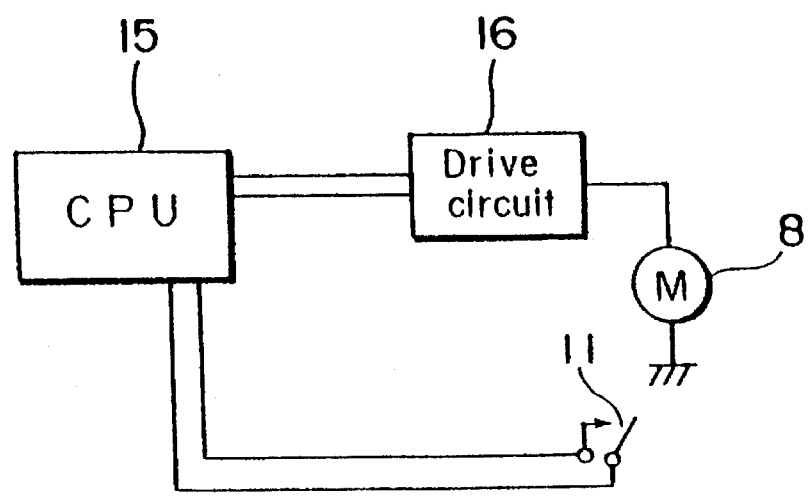
FIG. 2 is a circuit block diagram of such conventional optical disc apparatus.
Figure 5:
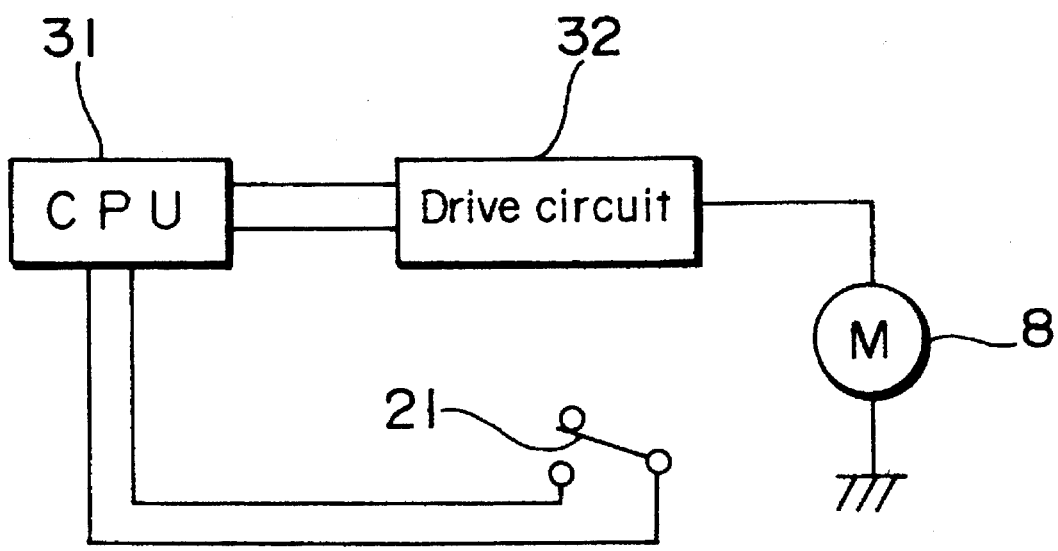
FIG. 5 is a circuit block diagram of the disc driving apparatus shown in FIG. 3.

FIG. 5 is a circuit block diagram of the embodiment representing the optical disc apparatus of FIG. 3. In this diagram, any component elements corresponding to those employed in the aforementioned apparatus of FIG. 2 are denoted by the same reference numerals.

At the start of a recording or reproducing operation immediately after the apparatus is switched on or the optical disc 1 is loaded therein, the CPU 31 checks the open state of the limit switch 21 and transmits a first command to the drive circuit 32 for moving the optical head 6 toward the innermost region, thereby applying a predetermined first voltage to the feed motor 8. Then a speed reduction mechanism 9 is driven with rotation of the feed motor 8, so that the optical head 6 is moved at a first speed toward the innermost region. Subsequently, when the limit switch 21 is turned on by the optical head 6 as mentioned, the CPU 31 transmits a second command to the drive circuit 32 in synchronism with such turn-on of the limit switch 21, whereby a second voltage is applied to the motor 8 for further moving the optical head 6 at a second speed which is lower than the aforementioned first speed. And thereafter the optical head 6 is pressed against the butt member 26 provided in the center portion 4a of the chassis 4, so that the optical head 6 is brought to a halt.

Figure 6:
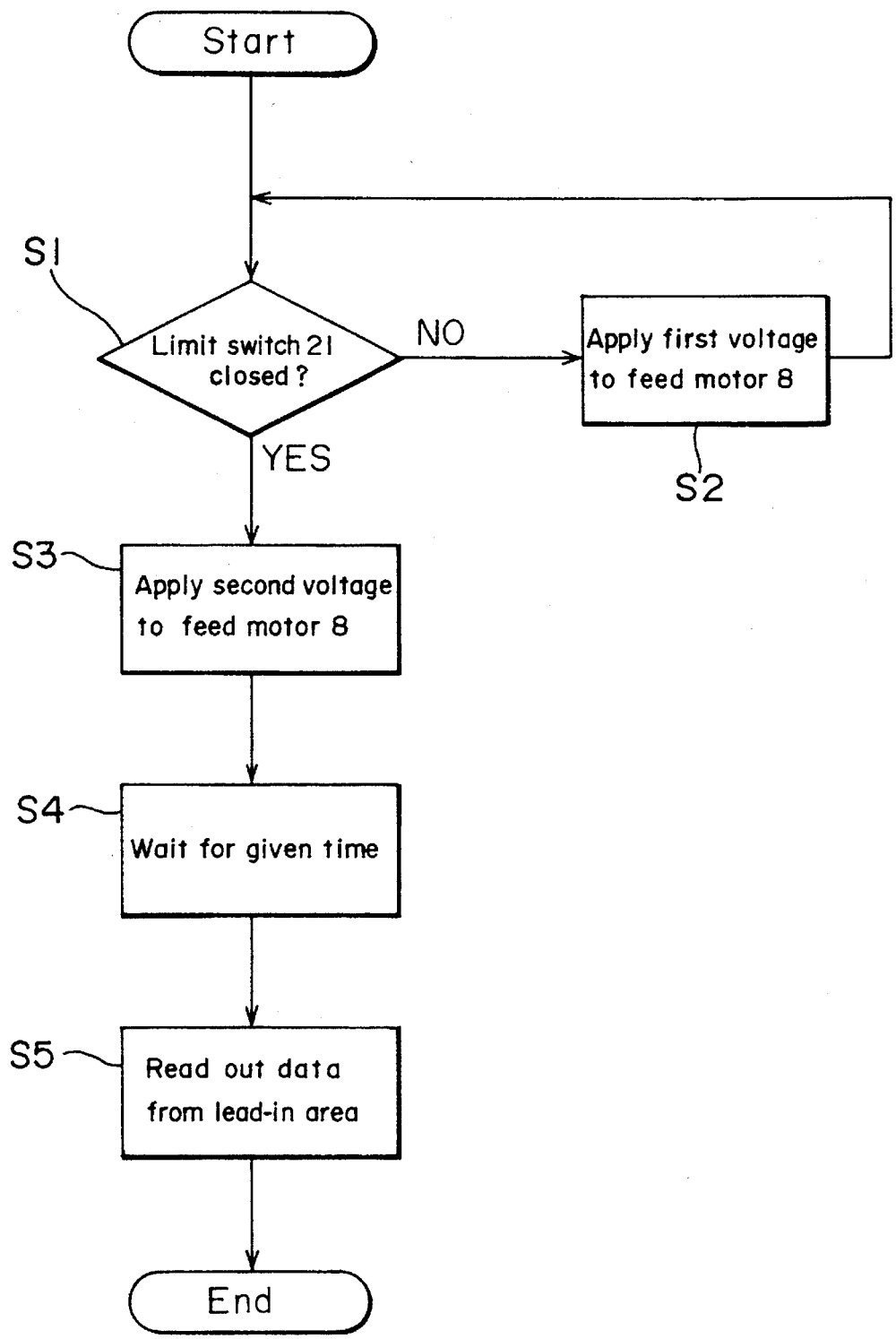
FIG. 6 is a flow chart of a processing routine executed by the CPU shown in FIG. 5.

Now the operation will be described below with reference to the flow chart of FIG. 6, which shows a processing routine executed by the CPU 31 in the apparatus of FIG. 3. When the optical head 6 is in the outer region, the CPU 31 makes a decision as to whether the limit switch 21 is closed or not (step S1). If the result of such decision by the CPU 31 signifies that the limit switch 21 is in its open state, a first command is transmitted from the CPU 31 to the drive circuit 32 for moving the optical head 6 toward the innermost region, and a first voltage is applied via the drive circuit 32 to the feed motor 8 (step S2), whereby the feed motor 8 is driven to move the optical head 6 at the first speed toward the innermost region.

When the optical head 6 being moved toward the innermost region closes the limit switch 21 as shown in FIG. 4(B), a second command is transmitted from the CPU 31 to the drive circuit 32, which then applies a second voltage to the feed motor 8 (steps S1 and S3), whereby the feed motor 8 is so driven as to change the motion of the optical head 6 from the first speed to the lower second speed. Consequently the optical head 6 is moved at the second speed toward the innermost region.

After the motion of the optical head 6 is changed to the second speed, the CPU 31 drives the feed motor 8 for a fixed period of time which will be described later, and then cancels the second command (step S4). In this case, the inner lateral portion 25 of the optical head 6 is pressed against the butt member 26 in the center portion 4a of the chassis 4 proximate to the guide shaft 7, so that the optical head 6 is brought to a halt at such position. Thereafter the optical head 6 reads out the data from the lead-in area of the optical disc 1.

The aforementioned fixed period of time, during which the feed motor 8 is driven by the CPU 31 at the second speed via the drive circuit 32, is set to be equal to or slightly longer than the time required for the optical head 6 to be pressed against the butt member 26 after closing the limit switch 21. It is a matter of course that the second speed needs to be set to an adequate value which causes no damage despite the pressed contact of the optical head 6 with the butt member 26.

Figure 7:
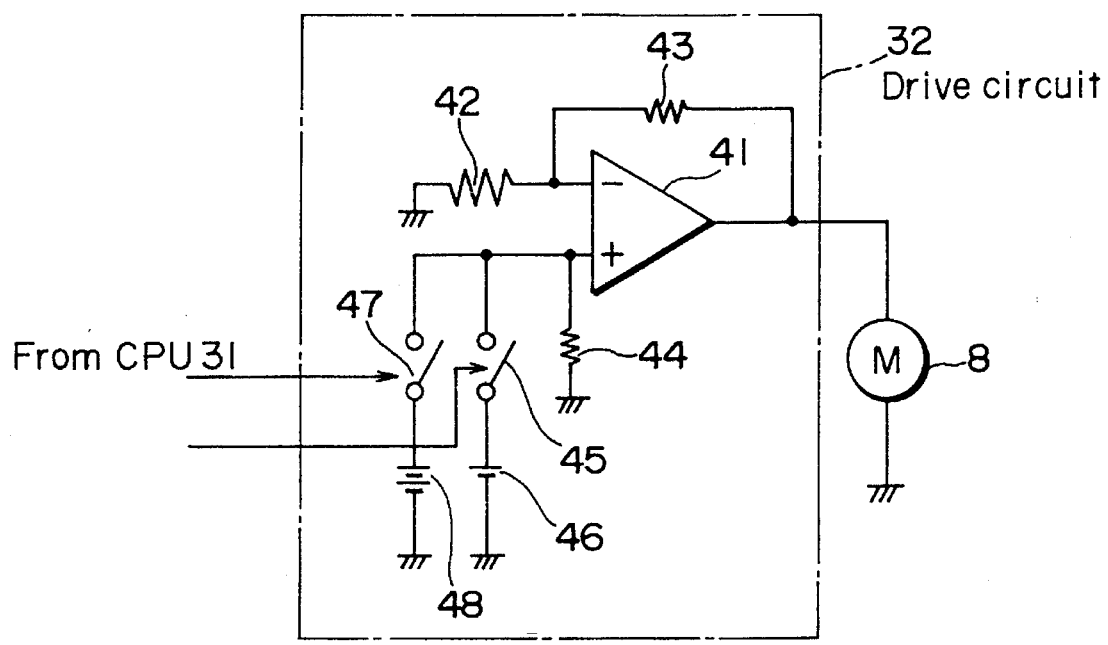
FIG. 7 is a circuit connection diagram of the drive circuit shown in FIG. 5.

FIG. 7 shows an exemplary drive circuit 32 for selectively changing the motion of the optical head 6 from the first speed to the second speed. Denoted by 41 in this diagram is an operational amplifier, whose negative input terminal is grounded via a resistor 42. An output terminal of the operational amplifier 41 is connected to the feed motor 8, and a positive input terminal thereof is grounded via a resistor 44 while being also grounded via a switch 45 and a DC power source 46. The positive input terminal of the operational amplifier 41 is further grounded via a switch 47 and another DC power source 48.

The switch 47 is turned on by the first command obtained from the CPU 31 or is turned off by the second command from the CPU 31. Meanwhile the switch 45 is turned on by the second command from the CPU 31 or is turned off in response to cancel of the second command.

Now the operation of the embodiment shown in FIG. 7 will be described below. The switch 47 is turned on in response to the first command obtained from the CPU 31 and supplied to the drive circuit 32, so that the first voltage is applied from the operational amplifier 41 to the feed motor 8. And upon supply of the second command from the CPU 31 to the drive circuit 32, the switch 47 is turned off while the switch 45 is turned on so that the operational amplifier 41 applies the second voltage to the feed motor 8. And when a second-command cancel signal is transmitted from the CPU 31 to the drive circuit 32, the switch 45 is turned off to reduce the output of the operational amplifier 41 to zero, whereby the rotation of the feed motor 8 is brought to a stop.

As obvious from the above description, in the record/reproduce apparatus for an optical disc such as a compact disc (CD) or a write-once (WO) CD, it is customary that, at the time of reading out the recorded data from the innermost lead-in area of the optical disc, the optical head 6 shifted inward is further moved, even after actuating the limit switch 21, to the innermost region for a given period of time until being pressed against the butt member 26, whereby the optical head 6 is accurately positioned in conformity with the mechanical location of the butt member 26.

In this case, the position for closing the limit switch 21 is generally not set with a high precision, and any positioning adjustment is not required. As for the butt member 26 in the center portion 4a of the chassis 4, a high precision is structurally achievable with facility. Even if there exist some variations in the closing position of the limit switch 21 due to the feed speed difference relative to the optical head 6, no harmful influence is exerted on the action of positioning the optical head 6. Consequently it becomes possible to eliminate the necessity of the positioning adjustment for the limit switch 21 while inducing none of harmful influence despite any positional variation in closing the limit switch 21, hence realizing highly accurate positioning of the optical head 6 with facility and at low cost.

Furthermore, due to the nonnecessity of the conventional operation for returning the light beam spot from the nonlead-in area (inside of the lead-in area) to the lead-in area, it is possible to shorten the time required until starting the recording or playback on the optical disc 1.

In the above embodiment where the feed speed of the optical head 6 is changed at the position of the limit switch 21, the second speed is settable to be higher than the first speed so that the optical head 6 can be shifted faster. To the contrary, it is also possible to lower the second speed of the optical head 6 posterior to actuation of the limit switch 21, thereby averting a trouble that the optical head 6 is broken or damaged by collision against the butt member 26 at a high speed.

Figure 8A:
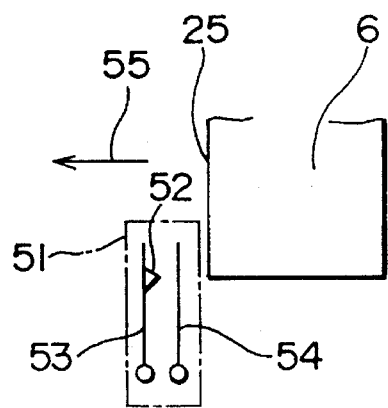
FIGS. 8(A) and 8(B) illustrate an exemplary modification of the limit switch shown in FIG. 3.

Although the limit switch 21 shown in FIGS. 3 and 4 is employed in the embodiment mentioned, the present invention is not limited to such example alone, and another exemplary limit switch 51 with a leaf spring of FIG. 8 may be used as well. In this modification, as shown in FIG. 8, the limit switch 51 consists of a leaf spring 53 with a contact 52 and a sensing member 54. The limit switch 51 is so disposed that, as shown in FIG. 8, the sensing member 54 can be pressed by the inner lateral portion 25 of the optical head 6. The limit switch 51 is connected to the unshown CPU 31 since it replaces the aforesaid limit switch 21 of FIG. 5.

Figure 8B:
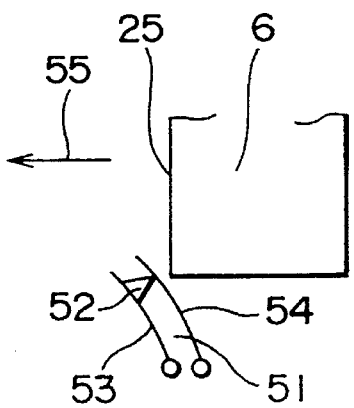

It is a matter of course that the position of the projection 4d of the chassis 4, to which the limit switch 51 is attached, is so selected that the stop position of the optical head 6 coincides with the lead-in area of the optical disc 1. The leaf spring 53 and the sensing member 54 are pressed by the optical head 6 as a result of its inward motion as indicated by an arrow 55 and then are brought into mutual contact as shown in FIG. 8(B), and in accordance with a further motion of the optical head 6, the leaf spring 53 is flexed while being kept in contact with the sensing member 54, so that the optical head 6 can further be shifted to a certain extent even after closing the limit switch 51.

Figure 9:
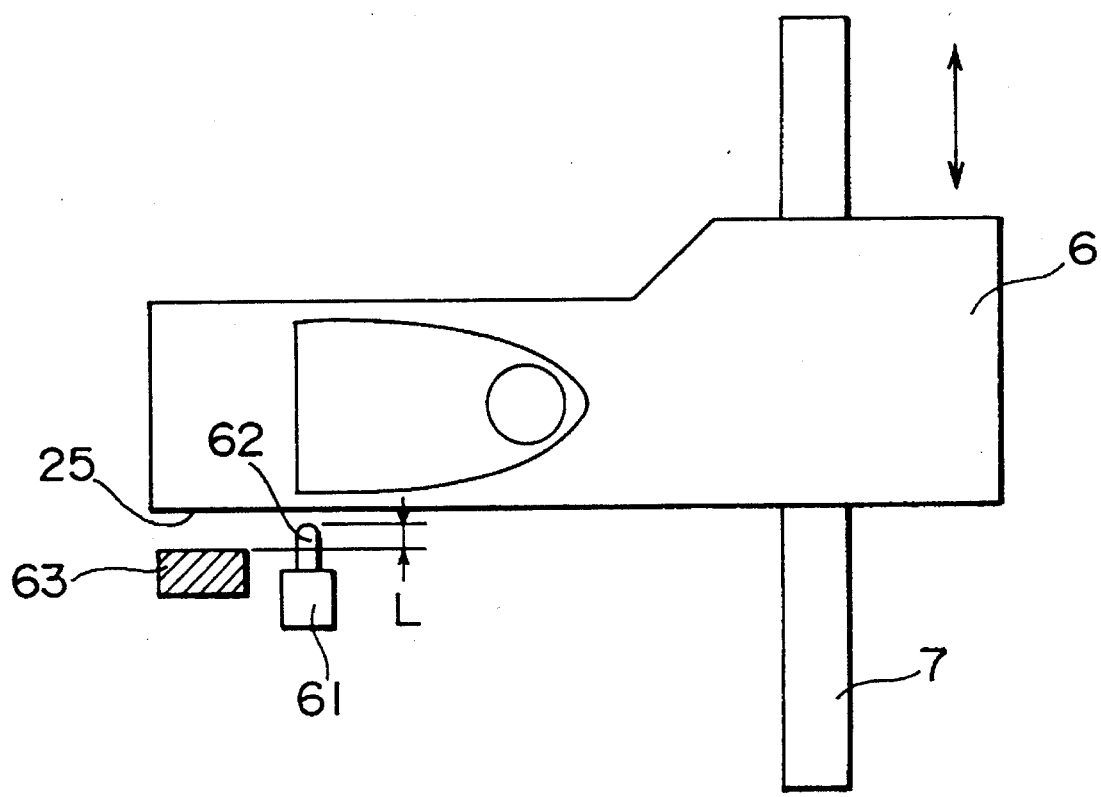
FIG. 9 is a schematic plan view of another preferred embodiment representing the disc driving apparatus of the present invention.

FIG. 9 shows a second preferred embodiment of the present invention where a limit switch 61 is so disposed that its contact 62 is pressed by the inner lateral portion 25 of the optical head 6. A positioning block 63 is provided on the chassis 4 in such a manner that the inner lateral portion 25 is brought into pressed contact with such block 63. The distance L between the fore end of the contact 62 and the positioning block 63 being not pressed by the inner lateral portion 25 of the optical head 6 is set to, e.g., 0.5 mm or so. The other structure is the same as that of the aforementioned first embodiment shown in FIG. 3.

Figure 10:
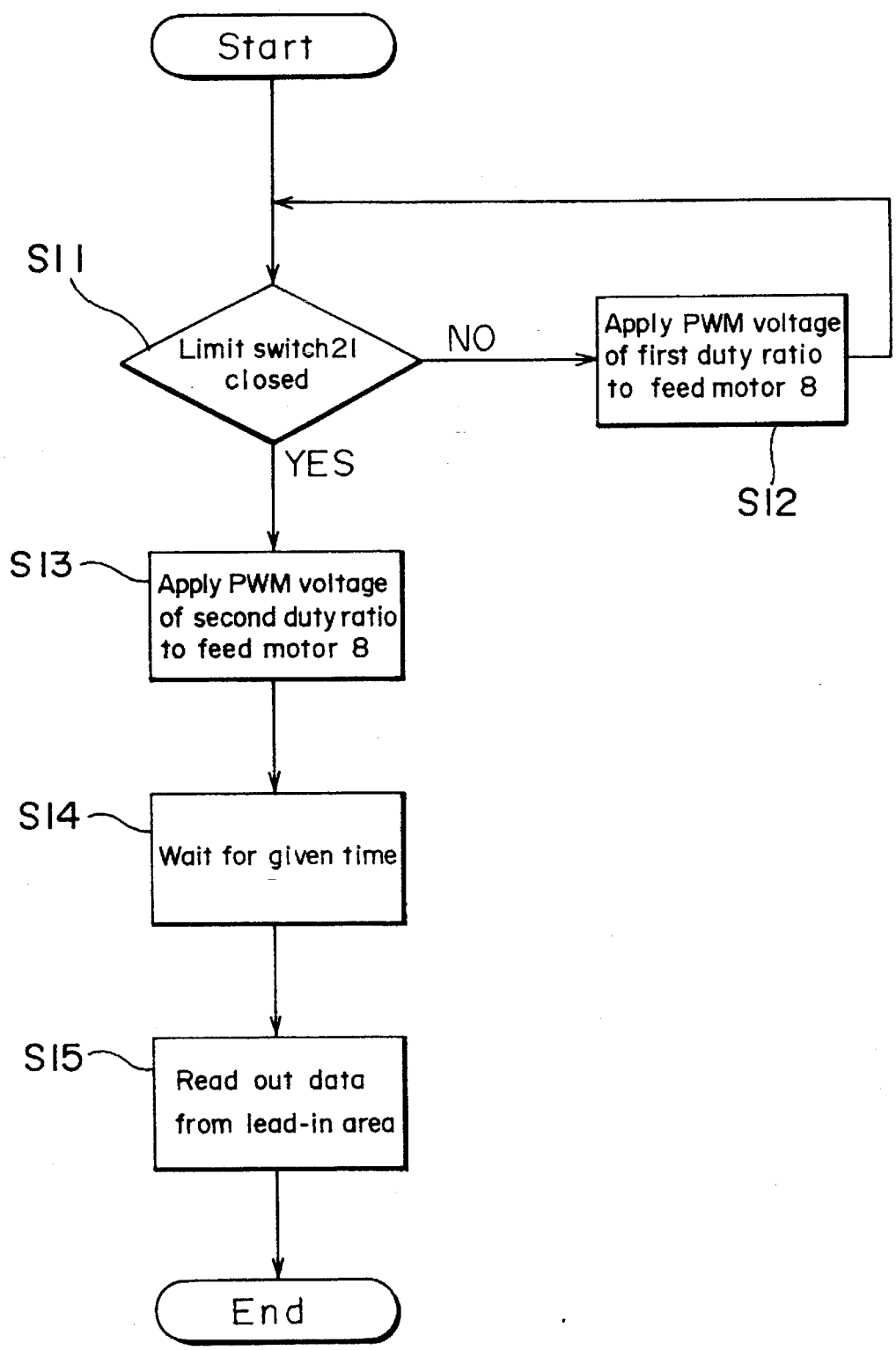
FIG. 10 is a flow chart of a processing routine executed by the embodiment of FIG. 9.

Hereinafter the operation of the second embodiment will be described with reference to a flow chart of FIG. 10. The processes executed at steps S11 through S15 in the flow chart of FIG. 10 are fundamentally the same as those at steps S1 through S5 in the aforementioned flow chart of FIG. 6. However, differing from steps S2 and S3 in FIG. 6 where the first voltage or the second voltage is selectively applied to the feed motor 8, steps S12 and S13 in FIG. 10 are carried out for selectively applying a PWM signal of a first duty ratio or a PWM signal of a second duty ratio to the feed motor 8.

Figure 11A:
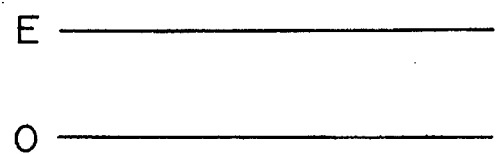
FIGS. 11(A) and 11(B) are explanatory diagrams of the duty ratios at steps S12 and S13 in the flow chart of FIG. 10.
Figure 11B:
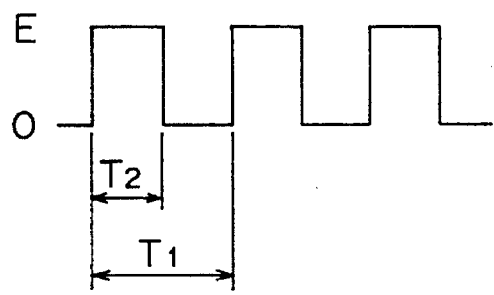

The first duty ratio is set to, e.g., 100 percent as shown in FIG. 11(A), whereas the second duty ratio is set to, e.g., 50 percent (T2/T1=0.5) as shown in FIG. 11(B). The voltage E applied to the feed motor 8 at step S12 can be reduced, by thus changing the duty ratio, substantially to the voltage E/2 applied to the feed motor 8 at step S13.

Figure 12:
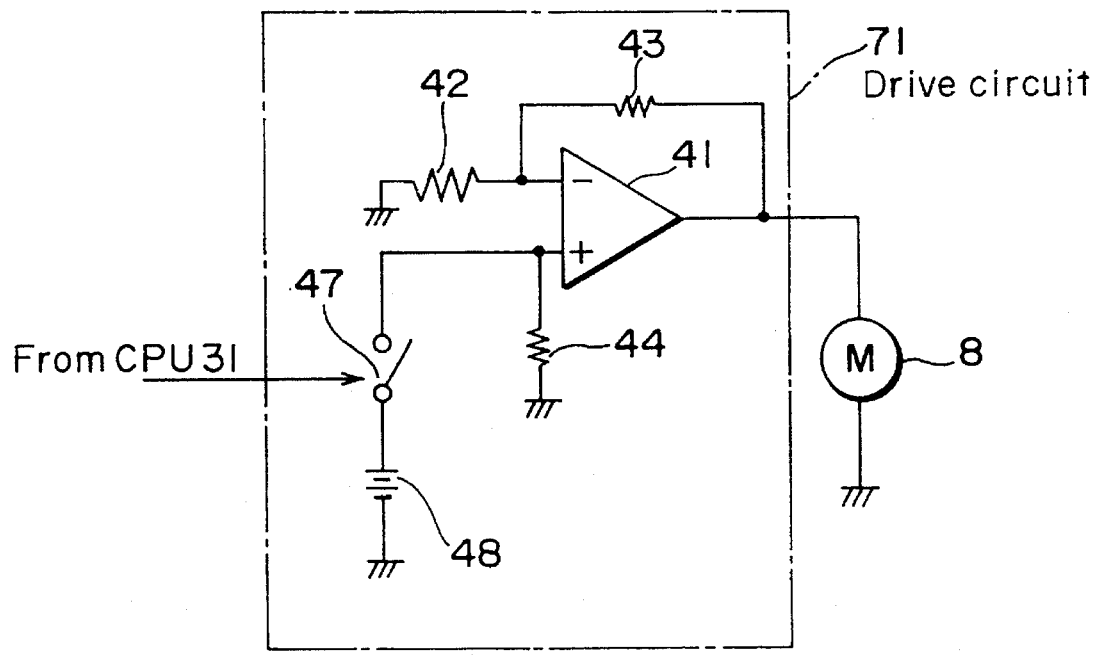
FIG. 12 is a block diagram of an exemplary drive circuit for realizing the process in FIG. 10.

FIG. 12 shows an exemplary configuration of a drive circuit 71 for controlling the rotation rate of the feed motor 8 by changing the duty ratio as mentioned. This drive circuit 71 is controlled by the CPU 31 to drive the feed motor 8 similarly to the foregoing example of FIG. 5. The configuration of the drive circuit 71 is fundamentally the same as that of the aforementioned example of FIG. 7 with the exception that the switch 45 and the DC power source 46 employed in FIG. 7 are omitted.

The CPU 31 controls the closing duration of the switch 47 in accordance with the duty ratio of the PWM signal. During the driving time at step S12, the switch 47 is held in its on-state. Meanwhile during the driving time at step S13, the switch 47 is turned on merely for a predetermined time T2 out of the period T1, or is turned off for a time T3 (=T1−T2=T2) equal to the on-time T1, and such on-off action is repeated. Consequently the feed motor 8 is driven by the PWM signal of the 100-percent duty ratio or that of the 50-percent duty ratio.

Thus, with regard to a disc type recording medium where information is recorded and/or reproduced optically, the present invention is adapted for accurately reading out the TOC data immediately after the apparatus is switched on or the disc is loaded therein.

According to the disc driving apparatus of the present invention, as described hereinabove, there are attainable the following advantageous effects.

[1] When the record/reproduce means moved toward the innermost region of the disc type recording medium by the feed means is brought to a stop while being pressed to the positioning means, the stop position is rendered proper in a manner that the spot of a light beam emitted from the optical head to the disc type recording medium is exactly coincident with a predetermined point in the innermost region, so that the optical head can be placed accurately at the predetermined position in the innermost lead-in area of the disc type recording medium with facility and at low cost.

[2] Due to elimination of the necessity of the known process for returning the light beam spot to the lead-in area from any deviated position outside thereof, it becomes possible to shorten the time required for starting the operation of recording information on or reproducing the same from the disc type recording medium.

[3] The motion speed of the optical head is changeable in response to the output of the detector means, and the first speed is settable to be higher than the second speed, so that the optical head can be moved faster.

What is claimed is:

1. A disc driving apparatus comprising:

an optical head for recording information on and reproducing information from a disc type recording medium having an innermost region which includes table of contents (TOC) information;

a detector means for detecting that the optical head is at a first predetermined position relative to the disc type recording medium;

a feed motor that moves the optical head in a radially inward direction of the disc-type recording medium at the initiation of a playback operation at a first speed toward the innermost region and, when the detector means detects that the optical head is at the first predetermined position that thereafter continues to move the optical head radially inwardly of the disc-type recording medium at a second, reduced speed for a predetermined period of time sufficient for the feed motor to move the optical head to a second predetermined position more proximate to the innermost region of the disc type recording medium than the first predetermined position; and a mechanical stop for restricting an inner limit of the radial motion of the optical head to the second predetermined position by butting against the optical head when the optical head is at the second predetermined position, wherein at the second predetermined position the optical head is aligned to read recorded information signals in the TOC from the innermost region of the disc type recording medium.

2. The disc driving apparatus according to claim 1, wherein a control means controls the feed means to change the speed of movement of the optical head by changing the duty ratio of a PWM signal.

3. The disc driving apparatus according to claim 2, wherein the control means controls the feed means to move the optical head at the first speed by setting the duty ratio of the PWM signal to 100 percent and the control means controls the feed means to move the optical head at the second speed by setting the duty ratio of the PWM signal to 50 percent.

4. The disc driving apparatus according to claim 1, wherein a control means controls the feed means to change the speed of movement of the optical head by changing the value of a DC voltage.

5. The disc driving apparatus according to claim 1, wherein a control means controls the feed means to move the optical head radially inward before the optical head starts transferring information signals.

6. The disc driving apparatus according to claim 1, wherein the detector means includes a switch actuated by the optical head.

7. The disc driving apparatus according to claim 6, wherein the switch is actuated by the optical head when the optical head is at a position slightly outside the innermost region of the disc type recording medium.

8. The disc driving apparatus according to claim 1, wherein the feed means comprises a rotary motor, and a speed reduction mechanism driven by rotation of the rotary motor for moving the optical head.

9. The disc driving apparatus according to claim 8, wherein the detector comprises a switch, and the feed means further comprises a drive circuit for driving the rotary motor responsive to a state of the switch.

10. The disc driving apparatus according to claim 1, wherein a control means includes a CPU.

* * * * *